United States Patent Office 3,502,611
Patented Mar. 24, 1970

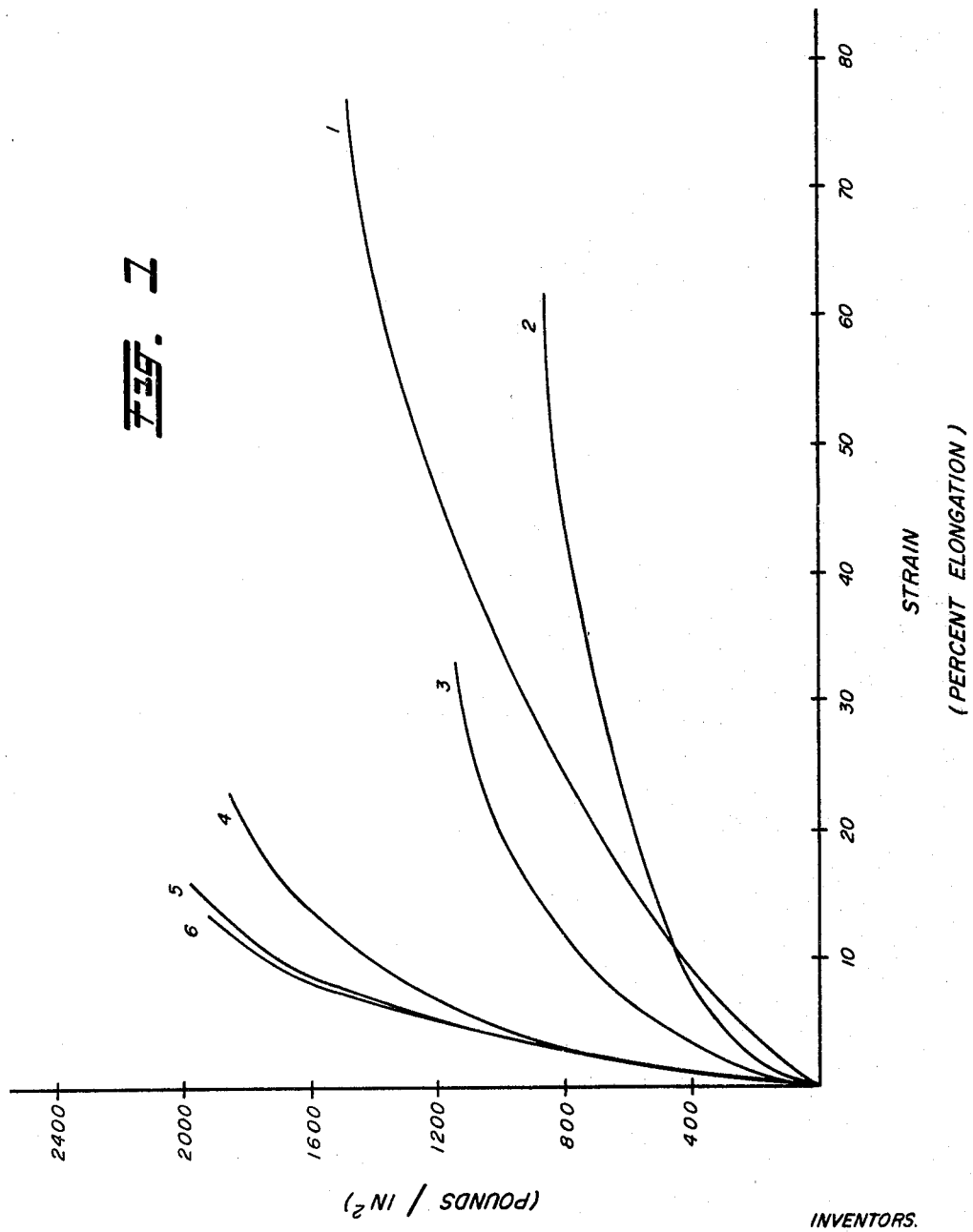

3,502,611
VINYL CHLORIDE POLYMER AND PLATY TALC COMPOSITIONS AND PROCESSES FOR THEIR PREPARATION
Leon B. Palmer, Little Falls, and Robert P. Conger, Park Ridge, N.J., assignors, by mesne assignments, to Congoleum Industries, Inc., Kearny, N.J., a corporation of Delaware
Continuation-in-part of application Ser. No. 262,014, Mar. 1, 1963. This application Nov. 13, 1967, Ser. No. 710,413
Int. Cl. C08f 45/06
U.S. Cl. 260—41                 8 Claims

ABSTRACT OF THE DISCLOSURE

This invention relates to the discovery that a particular form of platy talc having a maximum particle diameter of less than 100 microns, a surface area of at least 3 square meters per gram and a particle having a length of about 1 to 2 times its width has a reinforcing effect and improved dimensional stability in vinyl chloride compositions containing at least 60% vinyl chloride. The platy talc is utilized in from 65 to 200 parts in compositions containing from 65 to 400 parts of filler and about 20 to about 60 parts of plasticizer per 100 parts of polyvinyl chloride. Thin sheets of the composition formed into tiles have improved dimensional stability. The invention also relates to a process for producing such sheets by mixing the components of the vinyl chloride composition together to form a homogeneous mass and then passing the mass between calender rolls to form a sheet.

Cross-reference to related application

This application is a continuation-in-part of our pending application Ser. No. 262,014, filed Mar. 1, 1963, now abandoned entitled "Thermoplastic Composition Surface Covering and Process for Its Preparation."

BACKGROUND OF THE INVENTION

This invention relates to resinous compositions and particularly to such compositions for use in producing thin sheets for use as surface coverings and processes for utilizing the compositions.

Resinous composition surface coverings comprising synthetic resinous binder, stabilizers, plasticizers, fillers and color pigments have come to be widely used as coverings for floors, walls and the like. These products have excellent wearing properties and resistance to attack by a large range of household chemicals. The most widely used resinous composition is polymers of vinyl chloride, including copolymers, terpolymers and the like. These resin polymers have extremely high wear and stain resistance which makes them excellent for use as surface coverings. Because of the relatively high cost of the resins, it is common practice to add fillers to the composition to decrease the overall cost. The addition of such fillers in relatively large quantities is detrimental to the physical properties of the composition. As is apparent, therefore, the higher quality products have very little filler, whereas the low cost products for the mass market contain a high proportion of filler. These latter products can contain fillers and pigments in total amounts as high as 80% of the composition.

The detrimental effect of fillers in vinyl polymer resin compositions should be contrasted with that of rubber compositions wherein certain fillers serve as reinforcing agents which actually increase the desirable properties of the rubber composition. As an illustration, the addition of carbon black to rubber compositions greatly increases its tensile strength and modulus of elasticity. It is generally accepted in the synthetic resin-compounding industry that there are no known non-fibrous reinforcing fillers for vinyl resins. It was believed that the mechanical, chemical and dielectric properties of vinyl resins are influenced solely by the type and quantity of plasticizer used and it is possible to cover the whole range of properties by simply modifying the degree of plasticization.

A large range of fillers, such as silica, whiting, talc, clay, pumice and limestone, have been utilized with vinyl resins. Various criteria are used for selecting the different types of fillers, cost being one of the most significant. The physical properties of fillers which are the most critically scrutinized are the crystalline shape, particle size, and oil absorption value. The oil absorption value of the filler is critical in that the higher the absorption value, the more plasticizer which will be absorbed by the filler, thereby making less plasticizer available for carrying out the plasticization of the vinyl resin. Plasticizers are generally higher in cost than the resin and, therefore, only the minimum needed is used. Any plasticizer absorbed by the filler is wasted and, therefore, fillers of low oil absorption are usually used. Particle size or surface area of the filler is also important in processing vinyl resins. As a general rule, the smaller the particle size, the greater is the plasticizer absorption. Additionally, fine particle-size fillers greatly increase the processing problems in dispersing the filler in the resin and plasticizer. If the filler particles are too large, however, the composition will be non-homogeneous and, therefore, low in the desirable properties expected in vinyl resin compositions. The crystalline shape is important since fibrous fillers give tear strength to the product in the cross-direction to the fiber orientation.

DESCRIPTION OF THE PRIOR ART

Vinyl composition sheets are prepared by a number of different methods, including calendering, pressing and molding. In a calendering system where the relatively thin vinyl composition sheet has to be passed through a number of calender rolls and other operations, the strength of the sheet at the relatively high temperatures necessary for processing is of great importance. The ability of the sheet to adhere to the calender rolls is also a significant factor. Fibrous fillers will greatly increase the hot strength of a vinyl composition above that which can be obtained with the non-fibrous fillers. Additionally, some such fillers give compositions good roll adhesion. Fibrous fillers are those which have elongated structure, such as asbestos, wood flour, and fibrous talc. It has, therefore, become almost universal practice to utilize fibrous fillers when hot strength is needed in vinyl compositions. Such compositions are disclosed, for example, in U.S. Patent No. 2,558,378, issued on June 26, 1951, to Robert K. Petry. It is possible to utilize a composition which does not contain any fibrous fillers. Such a composition requires extremely careful handling of the sheet on the calender rolls necessitating relatively slow speeds to prevent any undue tension on the sheet which would cause it to collapse or break apart. Also, it is necessary to convey the sheet when not in contact with the calender rolls. Fibrous fillers, although having this highly desirable hot processing strength, have serious disadvantages in the finished products. Most of the fibrous fillers are highly water absorbent. The finished compositions, therefore, readily absorb water with the resultant adverse effect on the dimensional stability of the particular product. A vinyl composition sheet which has been cut into tiles and installed on a floor is a good illustration of this undesirable property. The absorption of water by the filler can cause the tiles to press against each other and raise away from the surface on which they are adhered. Once the adhesive bond with the undersurface has been broken, the only remedy is to remove the tiles, apply additional adhesive and reinstall the tiles. Another disadvantage of some fibrous fillers are their high abrasiveness which substantially reduces the normal life of the processing equipment. Asbestos is the most widely used fibrous filler since it is relatively water resistant compared to wood flour and less abrasive as compared to fibrous talc. Asbestos also gives the product good tear strength. Its major disadvantage, however, is in the iron usually present which causes severe discoloration of vinyl compositions. It is necessary, therefore, to use special stabilizers to prevent such discoloration. As is apparent, it would be highly desirable to have a filled vinyl resin composition which would have the required hot processing strength to enable the use of high speed calendering operations which does not have the disadvantages of compositions which contain fibrous fillers.

OBJECTS OF THE INVENTION

An object of the invention is to provide filled resinous compositions which have superior physical properties to unfilled compositions. Another object is to provide such compositions which have good strength at high temperature processing, good roll adhesion and very low water absorption. Another object of the invention is to provide vinyl compositions which have all the advantages of compositions containing fibrous filler while lacking many of the disadvantages of such compositions. A further object of the invention is to produce processes for producing vinyl composition sheets having excellent physical properties. Other objects and the advantages of the invention will appear hereinafter.

DESCRIPTION OF THE INVENTION

In accordance with the invention, it has been discovered that non-fibrous talc in the crystalline form of platelates has a reinforcing effect on vinyl compositions so that the tensile strength of the composition at the yield point on the stress-strain curve increases above that of identical compositions which do not contain any filler. he platy talc has the general formula

$3MgO4SiO_2H_2O$ and a mohs hardness of less than 2. The platelate crystalline structure is such that the length and width are in a ratio of about 1:1 to 2:1 and the thickness is substantially less than the length and width. The surface area of the particle is more than 3 square meters per gram as determined by the BET-nitrogen method, and preferably more than 8 square meters per gram. All the particles should be less than 100 microns in diameter and the majority of the particles should be less than 30 microns in diameter. Particularly desirable platy talc filler has an average particle size of less than 12 microns. The talc must also contain less than 1% combined calcium because this may change the crystalline structure. A platy talc, when used in excess of 20% of the filler components in the vinyl polymer compositions, exhibits all the desirable qualities of a fibrous filler without having the disadvantage of fibrous filler. The compositions in which it is used have low water absorption and, therefore, excellent dimensional stability. Such stability makes the composition ideally suited for use in thin tiles. Such tiles are usually not over 0.125 inch in thickness and are in 9, 12 or 18-inch widths. The compositions have excellent color, hot strength, are non-abrasive, have good roll adhesion and mix easily. In addition, the platy talc improves the physical properties of the vinyl polymer composition in tensile modulus.

The amount of platy talc is critical to the invention and is present in amounts of from 65 to 200 parts per 100 parts of vinyl chloride polymer and preferably 100 to 175 parts per 100 parts of polymer. It has also been discovered that the platy talc when used in combination with other fillers can make up as little as about 20% of the filler components with high filler loadings and still show good improvement. The total filler content of the vinyl chloride polymer compositions should be in the range of 65 to 400 parts per 100 parts of polymer. This discovery is believed to be particularly unexpected since the platy talc, although being non-fibrous, has a reinforcing effect on vinyl polymer compositions which was heretofore believed unobtainable. It is significant to note, however, when a talc is used which is a combination of platy and acicular substantially less improvement is obtained over fibrous talc. Platy talc has not previously been used in vinyl chloride polymer compositions which require high filler content because of its high cost, fine particle size and expected high plasticizer absorption.

As indicated previously, it would be expected that a filler having such a small average particle size would be difficult to process. It has been discovered, however, that the talc of this invention is very easy to process apparently because of this essentially platy crystalline structure which tends to leaf together giving an effectively larger particle size. As an illustration, an ultra-fine calcium carbonate, which is widely used as a filler in vinyl polymer compositions and has the same oil absorption value as some of the talcs of the invention, will not process well at all unless coated with stearic acid or rosin.

Polymers of vinyl chloride have been found to be particularly effective in formulating compositions for use in the invention. The vinyl chloride polymers can either be simple, unmixed homopolymers of vinyl chloride or copolymers, terpolymers or the like, in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of the extraneous comonomer is copolymerized therein. Suitable extraneous comonomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene; isoprene; chloroprene; 2,3 - dimethylbutadiene - 1,3; piperylene; divinyl ketone and the like.

The selection of the plasticizer for incorporation into the compositions of the invention is important in determining the strength and flexibility of the product. Typical plasticizers include dibutyl sebacate, dioctyl sebacate, dioctyl adipate, didecyl adipate, dioctyl azelate, triethylene glycol di (2-ethylhexanoate), diethylene glycol dipelargonate, triethylene glycol dicaprylate and the like. Plasticizers of the aromatic type, such as esters of aliphatic alcohols and aromatic acids or aromatic alcohols and aliphatic acids or aromatic alcohols and aromatic acids, including dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer should preferably have a low vapor pressure at the temperatures required to fuse the resin. A vapor pressure of 2 millimeters of mercury or less at 400° F. is usually considered satisfactory. The amount of plasticizer should be from about 20 to 60 parts per 100 parts of polymer.

Minor amounts of stabilizers which are incorporated to reduce the effects of degradation by light and heat are usually present in the composition. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of silver, calcium, cadmium, magnesium, cerium, sodium strontium and the like, glycerine, leucine, alanine, o- and p-amino benzoic and sulfanilic acids, hexamethylene tetramine, weak acid radicals including oleates, recinoleates, abietates, salicylates and the like. Normally, the composition contains from 0.5 to 5 parts stabilizer per 100 parts polymer.

The compositions, as previously indicated, can contain other fillers, such as limestone, whiting, clay, pumice, silica flour, wood flour, and the like. Various pigments can be used, such as titanium dioxide, lithopone, and various organic and inorganic color pigments. It is preferred that these other fillers be of the non-fibrous type to obtain the maximum advantage of the invention. The proper selection of filler combination will depend on the final oil absorption value desired for the composition. A typical equation for calculating this amount is as follows, wherein T represents the total weight of filler, Q the desired oil absorption value of the final composition, P the weight of platy talc, $Qp$ the oil absorption value of the platy talc, F the weight of second filler and $Qf$ the oil absorption value of the F filler:

$$Qp-Q=[F]$$
$$Qf-Q=[P]$$
$$[P]+[F]=T$$

Normally, from 0.5 to 10 parts pigments per 100 parts polymer are used.

DESCRIPTION OF THE PREFERRED EMBODIMENT

The vinyl chloride polymer compositions are conventionally prepared by blending the resin, plasticizer, filler, pigments and stabilizer together at temperatures substantially above the softening point of the resin which is usually between 275° F. and 375° F. This mixing operation is conventionally carried out in a Banbury mixer. The mixed composition is then sheeted by passing between calender rolls usually maintained at the mixing temperature but can be as much as 100° F. lower. It is conventional practice to maintain a temperature differential between the rolls to cause the sheet to adhere or follow one of the rolls. The calendered sheet can be subjected to further calendering to reduce its gauge and smooth its surface or the sheet can be converted into regular or irregular granules which are then mixed with similar granules of contrasting coloration and molded into a sheet. When using the preferred polyvinyl chloride resin, these operations are carried out at between 170° F. and 325° F. When the sheet is converted into granules, they are preferably within the range of about 0.01 inch to about 1.0 inch in diameter. The thickness of the granules will depend in large part on the thickness desired in the final sheet. As an illustration, a thickness of about 0.01 inch to about 0.024 inch is suitable for consolidation into a sheet about 0.03 inch thick. The granules are formed into a sheet in any desired manner, such as calendering, molding or extruding, following conventional practice. As indicated, the compositions of the invention are particularly useful in calendering operations. A typical calendering operation for forming a sheet is described in U.S. Patent No. 2,917,781, issued on Dec. 26, 1959, to Robert K. Petry. The sheet produced can be laminated to a backing sheet of resin impregnated felt, fabric or a resinous sheet and can also be cut into tiles or other appropriate shape, depending on the particular use to which the product is to be put. If the polymer composition is formed into tiles, it is preferred that the composition have a Shore D hardness of from 55 to 65 and a one-minute McBurney indentation value of 7.5 to 15 mils.

DESCRIPTION OF THE DRAWING

The reinforcing effect of the filler or filler combination can be readily seen by reference to FIGURE 1 of the drawing which shows a graph of the stress plotted against the strain as measured on an Instron unit, Model TM. The compositions tested had the following composition:

| | Parts |
|---|---|
| Polyvinyl chloride | 100 |
| Ba-Cd stabilizer | 1.7 |
| Ba-Zn stabilizer | 1.4 |
| Butylbenzyl phthalate | 17 |
| Epoxidized soya bean oil | 5 |
| Dioctyl phthalate | 17 |

Each composition was mixed on a two-roll mill for 5 minutes. The rolls were maintained at a temperature of about 300° F. and 320° F. respectively. The mixed composition was then sheeted between the same rolls to form a sheet 0.045 inch in thickness. Approximately 10 inches square sample, double layer, was preheated in a mold at 300° F.–330° F. for one minute and then pressed at the same temperature for three minutes at 600 pounds per square inch to form a sheet 0.064 inch in thickness. Curve 1 is the composition without any filler. Curve 2 is a composition containing 100 parts of calcium carbonate (York White 99.5% through 325 mesh screen). Curve 3 is a composition containing 100 parts of fibrous talc. A similar composition containing 100 parts asbestos has substantially the same curve when tested in the cross sheet direction. Curves 4, 5 and 6 are compositions containing 100 parts of Glacier 325 talc, Alabama 117 talc and Mistron vapor talc, respectively. A composition containing 100 parts asbestos, measured in the direction of calendering, has approximately the same curve as 4. The graph illustrates that when platy talc is used as a filler, the tensile modulus increases over 100%.

Table I demonstrates the reinforcing effect of the fillers of this invention over identical compositions without filler in that the tensile strength is increased. The composition utilized was that used for determining the data recorded in FIGURE 1 except that the amounts of plasticizer and Mistron vapor talc filler were varied as indicated. ("Phr." refers to parts per hundred parts of polymer.)

TABLE I

| Tensile strength (lbs./in.$^2 \times 10^3$) | Plasticizer (phr.) | Mistron vapor talc (phr.) |
|---|---|---|
| 3.30 | 30 | 0 |
| 3.05 | 30 | 25 |
| 2.85 | 30 | 50 |
| 3.30 | 30 | 100 |
| 3.75 | 30 | 125 |
| 2.35 | 30 | 225 |
| 3.05 | 40 | 0 |
| 2.50 | 40 | 50 |
| 4.15 | 40 | 125 |
| 1.10 | 40 | 225 |
| 2.55 | 50 | 0 |
| 2.35 | 50 | 15 |
| 2.15 | 50 | 30 |
| 2.05 | 50 | 50 |
| 3.10 | 50 | 150 |
| 3.65 | 50 | 200 |
| 1.95 | 50 | 240 |

Table II shows the physical properties of compositions with a platy talc and other talc. The compositions all contain 99 parts filler per 100 parts of resin and conform to the compositions used for Example 3.

TABLE II

| Talc | Crystalline shape | Plasticizer absorption [1] | Dimensional stability (shrinkage, mils/8 in.) [3] | Stress at 5% elongation [3] (lbs./in.) [2] | | Growth in water at 70° F. (mils/5 in.) [4] | |
|---|---|---|---|---|---|---|---|
| | | | | 70° F. | 400° F. | 96 hrs. | 240 hrs. |
| $T_1$ | Acicular and Platy. | 67 | 235 | 905 | 3.0 | 26 | 38 |
| $T_2$ | Fibrous | 55 | 230 | 1,007 | 3.2 | 33 | 57 |
| $T_3$ | Platy | 45 | 160 | 1,331 | 11.2 | 16 | 19 |
| $T_4$ | do | 44 | 144 | 1,496 | 8.4 | 9 | 16 |
| $T_5$ | do | 86 | 131 | 1,381 | 10.2 | 14 | 15 |

[1] Rub out method: Platicizer is added dispersed on a one-gram sample of the talc until the sample] s a very stiff, putty-like paste which does not break or separate.
[2] Test is conducted by placing marks on the surface of the sheet, 8 inches apart. The marker sample is placed in an oven at 300° F. for a period of fifteen minutes and then removed and the distance between the marks measured. The results are reported in mils as the distance between the marks subtracted from 8 inches.
[3] The test is carried out with an Instron unit Model TM. The sample was heated to the temperature indicated, elongated 5% and the tensile strength at the elongation recorded.
[4] Marks are placed 5 inches apart on the surface of the sheet and the sheet placed in water for the period of time indicated and then the distance between the marks measured. Measurements are made at right angle to the machine direction (T).

$T_1$—Mistron T-076 talc, supplied by Sienna Talc Co., Inc. Newark, N.J. A mixture of acicular and platy crystalline material, maximum particle size about 15 microns, surface area of 10 m.²/g. (BET-$N_2$ absorption method).

$T_2$—6N Talc, particle size all below 40 mesh screen and 77% through a 320 mesh screen. Oil absorption 40 ml./20 g. (Gardner-Coleman method) (58% $SiO_2$, 27% MgO). Fibrous crystalline structure.

$T_3$—Glacier 325, supplied by the Sienna Talc Co., Inc. Particle size all below 44 microns, average below 11 microns, surface area 8.1 m.²/g.

$T_4$—Alabama 117, supplied by H. M. Royal Inc., Trenton, N.J. Particle size all below 100 microns, average below 30 microns, surface area 3.3 m.²/g.

$T_5$—Mistron vapor, supplied by Sienna Talc Co., Inc. Particle size all below 6 microns in diameter, average below 2 microns, surface area 19 m.²/g.

The following examples are given for purposes of illustration:

EXAMPLE 1

A composition having the following formula was prepared by mixing with about 2% of color pigment in a Banbury mixer at 300° F. until the composition was homogeneous:

| | Percent |
|---|---|
| Copolymer of vinyl chloride (87%) and vinyl acetate (13%) | 16.0 |
| Stabilizer (Ba-Cd) | .4 |
| Epoxidized soya bean oil | .4 |
| Butyl benzyl phthalate | 5.0 |
| Glacier talc #325 | 13.2 |
| Limestone | 65.0 |

The composition was formed into a sheet of 0.125 inch in thickness by passing between three sets of calendar rolls heated at progressively decreasing temperatures from 290° F. to 170° F. The gauge of the sheet was reduced from 1½ inch in thickness. The sheet produced, when cut into square tiles of 81 sq. inch surface area, had excellent resistance to heat shrinkage and growth in water. The physical properties of the sheet produced were compared to a similar sheet containing asbestos fiber instead of the talc. The comparison is contained in Table III.

TABLE III

| Growth in water at 70° F., mils/5" | Talc formula | Asbestos formula |
|---|---|---|
| 5 days: | | |
| In direction of calendar (P) | 2 | 9 |
| Right angles to direction of calendar (T) | 2 | 24 |
| Percent water absorption | 0.7 | 1.55 |
| 12 days: | | |
| P direction | 6 | 13 |
| T direction | 6 | 29 |
| Percent water absorption | 1.0 | 2.25 |
| Dimensional stability—Change in mils per 8 in. after 6 hrs. at 180° F.: | | |
| P direction | −4 | −21 |
| T direction | +5 | −3 |

EXAMPLE 2

A composition having the following formula was prepared by mixing in a Banbury mixer at 350° F. until the composition was homogeneous:

| | Percent |
|---|---|
| Polyvinyl chloride | 24.45 |
| Stabilizer (Ca-Zn) | .63 |
| Basic carbonate white lead | 1.31 |
| Epoxidized soya bean oil | 1.05 |
| Tricresyl phosphate | 5.79 |
| Butyl benzyl phthalate | 4.62 |
| Chlorinated paraffine | 1.15 |
| $CaCO_3$ (fine) | 14.08 |
| $CaCO_3$ (coarse) | 31.00 |
| Mistron vapor talc | 15.92 |

Approximately 2 percent of pigment was added to the composition prior to mixing. The composition was sheeted between two sets of calendar rolls to form a sheet having a thickness of about 0.020 inch. The calendar rolls were heated to about 275° F. The composition had excellent roll adhesion and hot strength during processing. The sheet formed also had excellent dimensional stability and processability.

EXAMPLE 3

Following the procedure of Example 2, a sheet was formed from the following composition:

| | Percent |
|---|---|
| Polyvinyl chloride | 24.45 |
| Stabilizer (Cd-Zn) | .63 |
| Basic carbonate white lead | 1.31 |
| Epoxidized soya bean oil | 1.05 |
| Tricresyl phosphate | 5.79 |
| Butyl benzyl phthalate | 4.62 |
| Chlorinated paraffine | 1.15 |
| $CaCO_3$ | 38.00 |
| Alabama #117 talc | 23.00 |

EXAMPLE 4

The following composition was mixed in a Banbury mixer at 350° F., with the addition of about 2% pigment, until a homogeneous composition was formed:

| | Percent |
|---|---|
| Polyvinyl chloride | 31.62 |
| Stabilizer (Ba-Cd) | .54 |
| Stabilizer (Ba-Zn) | .47 |
| Butyl benzyl phthalate | 4.49 |
| Epodized soybean oil | 1.49 |
| Dioctyl phthalate | 4.49 |
| Calcium carbonate | 25.29 |
| Furnace Creek talc [1] | 31.61 |

[1] Talc having a platy crystalline shape. The particle size was all less than 100 microns in diameter and half of the material was less than 30 microns in diameter. The mean diameter was 2.81 microns. The surface area was 3.1 m.²/g. and the oil absorption 8/15 ml./20 g. as measured by the Gardner-Coleman method.

The composition was then sheeted between calendar rolls heated at 290° F. to form a sheet of 0.125 inch in thickness. The sheet was then converted to irregular granules of about one-half inch in diameter and the granules mixed with similar granules of contrasting color and placed in a mold in a layer of about 0.25 inch thick. The granules were then molded together under a heat of about 350° F. and sufficient pressure to form a sheet 0.125 inch thick. The sheet produced had excellent dimensional stability.

Any departure from the above description which conforms to the present invention is intended to be included within the scope of the claims.

What is claimed is:

1. In a flat, solid sheet having a thickness not exceeding about 0.125 inch and useful as a surface covering comprising a homogeneous mixture of plasticized thermoplastic vinyl chloride polymer containing at least 60% vinyl chloride, about 20 to 60 parts of plasticizer and about 65 to about 400 parts of a non-fibrous filler for each 100 parts of polymer, the improvement which comprises increasing the tensile modulus of said sheet at least 100% and substantially increasing its dimensional stability by utilizing as said filler at least 65 to 200 parts per 100 parts of polymer of a platy talc having a Mohs hardness of less than 2, a maximum particle diameter of less than 100 microns and a surface area of at least three square meters per gram, the length of each particle of said platy talc being one to two times the width of the particle and the thickness of each particle being substantially less than the length and width.

2. The flat, solid sheet of claim 1 wherein said platy talc comprises particles having a surface area of at least 8 square meters per gram.

3. The flat, solid sheet of claim 1 wherein said platy talc particle size is less than 12 microns.

4. The flat, solid sheet of claim 1 wherein said vinyl chloride polymer is a copolymer of vinyl chloride and vinyl acetate containing at least 60% of vinyl chloride.

5. The flat, solid sheet of claim 1 wherein said talc particles are less than 44 microns in diameter and at least half of the talc particles by weight have a diameter of less than 11 microns and said particles have a surface area of about 8 square meters per gram.

6. The flat, solid sheet of claim 1 wherein said talc particles are less than 100 microns in diameter and at least half of the talc particles by weight have a diameter of less than 30 microns, and said particles have a surface area of about 3 square meters per gram.

7. The flat, solid sheet of claim 1 wherein said talc particles are less than 6 microns in diameter and at least half of the talc particles by weight have a diameter of less than 2 microns and said particles have a surface area of about 19 square meters per gram.

8. The flat, solid sheet of claim 1 wherein said composition contains at least 10% by weight of calcium carbonate as a second filler.

References Cited

UNITED STATES PATENTS

| | | | |
|---|---|---|---|
| 3,157,614 | 11/1964 | Fischer | 260—41 |
| 2,773,851 | 12/1956 | Tolman | 260—30.6 |

ALLAN LIEBERMAN, Primary Examiner

J. H. DERRINGTON, Assistant Examiner

U.S. Cl. X.R.

260—41.5